United States Patent [19]

Fletcher et al.

[11] 4,012,696
[45] Mar. 15, 1977

[54] MULTIPLE RATE DIGITAL COMMAND DETECTION SYSTEM WITH RANGE CLEAN-UP CAPABILITY

[76] Inventors: James C. Fletcher, Administrator of the National Aeronautics and Space Administration, with respect to an invention of; James R. Lesh; Stanley A. Butman, both of Pasadena, Calif.

[22] Filed: Feb. 17, 1976

[21] Appl. No.: 658,449

[52] U.S. Cl. .............................. 325/4; 343/6.5 R; 343/6.8 R; 343/100 ST

[51] Int. Cl.² ........................................ H04B 7/14

[58] Field of Search ....... 325/4; 343/100 ST, 6.5 R, 343/6.8 R, 147.54

[56] References Cited

UNITED STATES PATENTS

| | | | |
|---|---|---|---|
| 3,290,677 | 12/1966 | Jacob | 343/10 |
| 3,305,861 | 2/1967 | Bunce | 343/12 |
| 3,341,845 | 9/1967 | Deman | 343/65 R |
| 3,530,467 | 9/1970 | Attwood | 343/13 |
| 3,530,470 | 9/1970 | Sheftelman | 343/6.5 R |
| 3,659,292 | 4/1972 | Martin | 343/6.5 R |
| 3,683,279 | 8/1972 | Weinberg | 325/4 |
| 3,710,255 | 1/1973 | Gicca | 325/4 |
| 3,729,736 | 4/1973 | Hurd | 343/6.5 R |
| 3,860,921 | 1/1975 | Wood | 343/6.5 R |

*Primary Examiner*—Robert L. Griffin
*Assistant Examiner*—Michael A. Masinick
*Attorney, Agent, or Firm*—Monte F. Mott; Paul F. McCaul; John R. Manning

[57] ABSTRACT

A multi-rate digital command system is disclosed which uses the composite signal of a $\mu$-type ranging system as a subcarrier to transmit range codes and data from a station to a receiver where the range codes are sequentially phase modulated on a subcarrier of frequency $f_{sc}$ by one of its own subharmonics as follows:

$$C_i = f_{sc} \oplus f_{sc}/2^i$$

and data is phase modulated on a selected ranging component, $C_i$, where $i$ is a number selected from the sequence $1, 2 \ldots n$ in which the ranging components are transmitted. A range cleanup loop in a spacecraft locks the phase of a locally generated reference component $C_i$ to a received ranging component $C_i$ and retransmits the component to a ground station. When the inverse phase, $\overline{C}_i$, of a ranging component is received and detected, the cleanup loop is modified to demodulate phase modulated command symbols while continuing tracking the same ranging component $C_i$. The command symbol rate is coherently related to the ranging signal component bit rate.

19 Claims, 5 Drawing Figures

MULTIPLE RATE DIGITAL COMMAND DETECTION SYSTEM WITH RANGE CLEAN-UP CAPABILITY

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; U.S.C. 2457).

BACKGROUND OF THE INVENTION

This invention relates to command and ranging systems, and more particularly to a method and apparatus for multiple rate digital command detection with range cleanup capability upon transmitting commands to a spacecraft on the ranging subcarrier.

Most spacecraft employ phase-locked receivers that track an unmodulated (or residual) uplink carrier signal. Consequently, all information transmitted to the spacecraft must be such that, when modulated onto the carrier signal, the information contained in the modulation sidebands falls outside the receiver tracking loop bandwidth. Because of this, information signals containing a large amount of low-frequency energy (such as command or ranging signals) must first be modulated onto an intermediate carrier (or subcarrier) before finally being modulated onto the carrier. The introduction of the subcarrier, however, is not a "cure-all" since in order to coherently demodulate the information signal one must coherently track the subcarrier in addition to the carrier and data. The standard approach is to provide independent tracking loops to "track-out" all of the information contained in each of the carriers.

In the past a dedicated unmodulated carrier uplink signal has been required for a spacecraft narrow-band, phase-locked-loop receiver to track signals from the ground. Low frequency signals, such as commands to the spacecraft, have been required to fall outside the tracking loop bandwidth and have been first modulated onto an intermediate carrier or subcarrier before being modulated onto the carrier. This required that the spacecraft provide independent tracking loops to demodulate all of the information on these carriers and subcarriers. Additionally, a separate subcarrier channel was required for ranging.

In respect to ranging information, binary coded, sequential acquisition ranging systems of the so-called $\mu$-type have been used in an arrangement disclosed in the U.S. Pat. No. 3,659,292. Ranging systems of that type are improved by a code regenerative cleanup loop disclosed in U.S. Pat. No. 3,729,736. The cleanup loop technique is to track and detect in sequence binary codes phase modulated on a subcarrier where the range code period is successively increased for greater range resolution. In practice, the subcarrier and modulating range code bit rates are related by a power of two, but such a restraint is not necessary.

OBJECTS AND SUMMARY OF THE INVENTION

An object of this invention is to provide a command system for communication with a spacecraft using a composite signal for a subcarrier in such a way that it can also convey range information.

A further object of this invention is to provide optimum detection of the command and ranging signals using the same detector, and without the need to provide a symbol tracking loop.

These and other objects of the invention are achieved in a range tracking system having a code regenerative cleanup loop by using the subcarrier sequentially modulated for ranging as a command signal subcarrier, thus obviating the need for a separate command subcarrier channel from the spacecraft. The subcarrier of frequency $f_{sc}$ is phase modulated for ranging by one of its own subharmonics, as follows:

$$C_n = f_{sc} \oplus f_{sc}/K^n \qquad (1)$$

where $\oplus$ indicates modulo 2 addition if the subcarrier is a squarewave signal of levels 0 and 1, or multiplication if the subcarrier is a squarewave signal of peak levels $+1$ and $-1$, and $n$ denotes that the ranging code components are used sequentially by first sending the code component $C_1$ for a period of time, than $C_2$, and so on to the $n^{th}$ component, each time increasing the value of $n$. A function generating means in the cleanup loop initially generates components $C_1$ and $C_2$ until the component $C_1$ is received and correlated by a first correlating means. The loop tracks $C_1$ until the signal $C_2$ is received and correlated by a second correlating means, at which time a second detection means threshold detects the received signal $C_2$. The function generating means is then switched to generate components $C_2$ and $C_3$ by control means in response to the first and second detection means. Once that switching is done, the loop tracks the received signal $C_2$. When the second detection means detects the component $C_3$, the control means again switches the function generating means to generate components $C_3$ and $C_4$ in place of respective components $C_2$ and $C_3$. The cleanup loop process continues, each time tracking the next component in sequence until a command is to be transmitted to the spacecraft. At that time the complement $\overline{C_i}$ of the component then being transmitted is substituted for the component $\overline{C_i}$ in the ranging subcarrier. Once the component $C_1$ is received and detected by the first detection means, the control means activates mode control switches in the system from a first position to a second position, thus converting the system from an acquisition mode to a command demodulation mode during which the cleanup loop continues to track the range code component $C_1$. The sign of the output from the first correlating means at the end of each symbol time will constitute a command symbol coupled out of the loop through a first mode switch.

Once the complement $\overline{C_i}$ is detected, and the demodulation mode is initiated, the input to the first correlating means is modified through a second mode switch to detect and compensate for the sign of each symbol being correlated in order that the cleanup loop continue to track the component $C_i$ even though the subcarrier is then being modulated with data such that it is initially $\overline{C_i}$ but is subsequently $C_i$ for different symbol periods according to the command being transmitted. The cleanup loop is modified through a third mode switch to operate as a data-aided phase-locked loop for more accurate tracking of $C_i$ during the command demodulation mode.

When a component $C_{i+1}$ is received, the second correlating and detecting means will detect it and cause the mode switches to revert to the acquisition mode, and at the same time step the function generating means to the generation of components $C_{i+1}$ and $C_{i+2}$.

If at any time the correlating and detection means fail to detect any code component, the control means will deactivate the mode switches to revert to the acquisition mode and at the same time revert to the generation of codes $C_1$ and $C_2$.

The novel features that are considered characteristic of this invention are set forth with particularity in the appended claims. The invention will best be understood from the following description when read in connection with the accompanying drawings.

DESCRIPTION OF THE PREFERRED EMBODIMENTS

Before proceeding with a description of the present invention, the range cleanup loop disclosed in the aforesaid U.S. Pat. No. 3,729,736 will first be introduced in general terms.

The range from a ground tracking station to a spacecraft is determined by measuring the round-trip time required for a ranging code sequence signal to be transmitted from the station to the spacecraft and transponded back to the ground station. In typical existing spacecraft, the ranging transponders demodulate the received ranging signal and remodulate it onto a different RF carrier for retransmission to the earth.

A major problem with such transponders is that both the received ranging signal and the receiver noise are retransmitted on the downlink. This means that when the signal to noise ratio of uplink ranging channel is below unity, most of the downlink ranging power is wasted on transmitting receiver noise rather than ranging signal. The problem is extremeley severe on outer planet missions.

To overcome the problem of retransmission of receiver noise, a digital signal processing system was developed to regenerate a binary coded sequential ranging component in the spacecraft for transmission to the ground. That system, called a cleanup loop, phase locks on the received ranging component and generates a clean replica of the received ranging component for retransmission on the downlink. It is in the context of that development that the present invention has been made. The concept of the invention is to use the cleanup loop to demodulate command symbols modulated on a ranging code.

Figure 1:
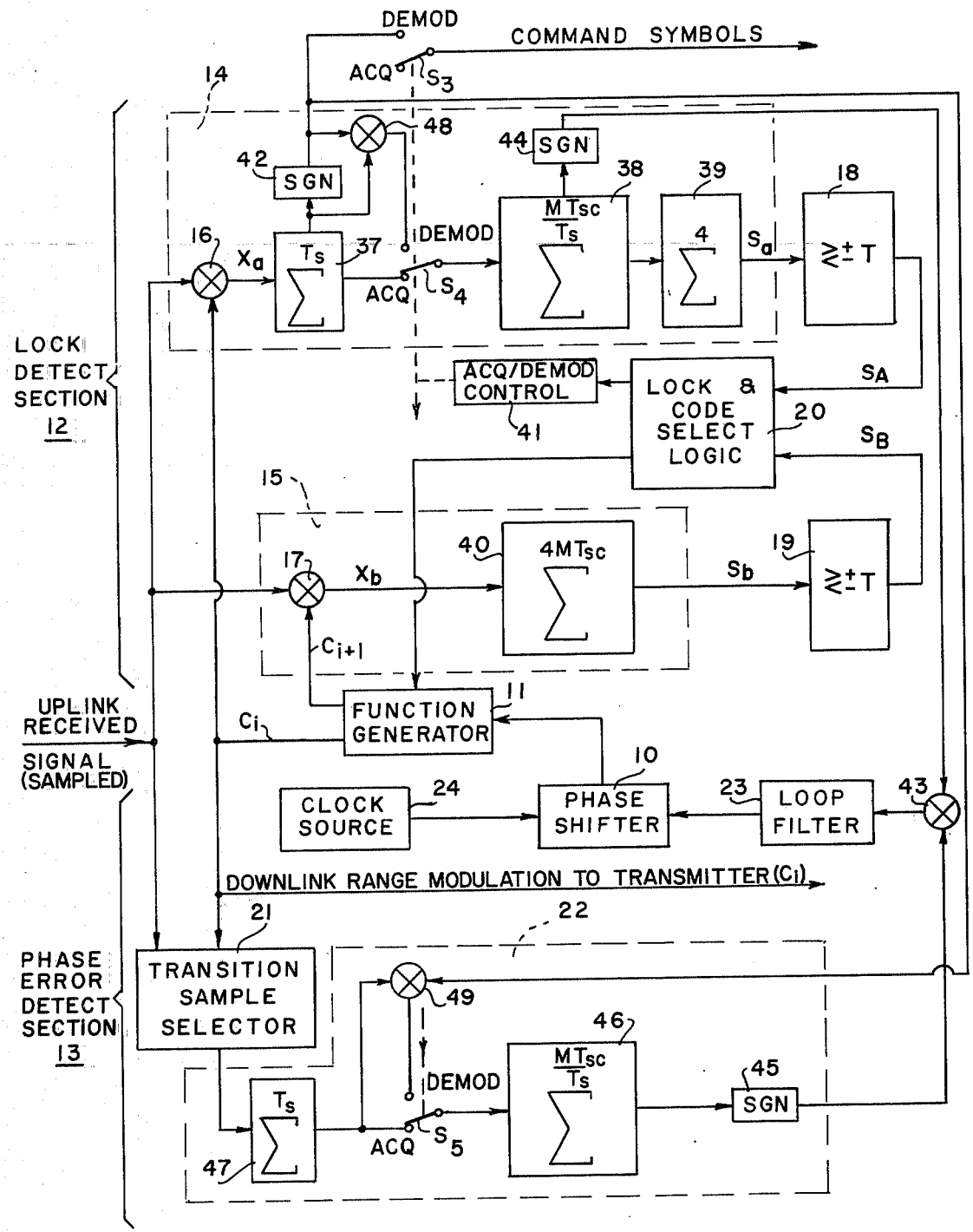
FIG. 1 is a functional block diagram of the present invention.

Referring to FIG. 1, the cleanup loop is actually a generalization of a phase-locked loop wherein the loop voltage-controlled oscillator (VCO) is replaced by a phase shifter (bumper) 10 and a function generator 11. The function generator provides a synchronous version of the range code component $C_i$ being received. In addition, the function generator also provides a second range code component $C_{i+1}$ consisting of the next lower range component. Thus, the subcarrier signal received consists of a signal of frequency $f_{sc}$ phase modulated by one of its own subharmonics. For example, after initially sending component $C_1$ for a sufficient period of time, the component $C_2$ is sent, then $C_3$, and so on, where each component is represented by $$C_i = \overline{f_{sc}} \oplus \frac{\overline{f_{sc}}}{2^i} \tag{2}$$

$\overline{f_{sc}}$ denotes a square wave, and $\oplus$ denotes modulo 2 addition, if the squarewave levels are 0, 1, or denotes multiplication if the levels are +1, −1.

The cleanup loop is comprises of two main sections: a lock detection section 12, and a phase error detection section 13. The latter section operates essentially like a phase-locked loop to maintain the reference code $C_i$ from the function generator in phase with the received subcarrier signal $C_1$. It is the lock detection section which determines the code $C_i$ to be furnished to the phase error detection section and to the transmitter to be retransmitted to the ground station, and the code $C_{i+1}$ to be used in detecting a transition of the received range code to the next range code in sequence.

Included in the look detection section are two correlators 14 and 15 for correlating the respective components $C_i$ and $C_{i+1}$ from the function generator 11 with the range code being received. A mixer (exclusive-OR circuit) 16 effectively compares the reference component $C_i$ with the incoming range component to produce a bit 0 output when they are alike and a bit 1 output when they are not alike. For example, assuming the function generator component $C_i$ is equal to the range code $C_2$, the output of the mixer 16 is given by the equation $X_a = C_i \oplus C_2$. Given that $C_i$ and $C_2$ are in phase, as they are made to be by the phase error detection section, $X_a$ will be equal to a bit 0 at all times. $X_a$ is sampled for accumulation over a period of $4MT_{sc}$, where $T_{sc} = 1/f_{sc}$, $f_{sc}$ is the subcarrier (basic) frequency (i.e., the frequency of $C_o$), and M is the number of subcarrier cycles per phase correction (phase bump) in the phase shifter 10. Upon multiplying $C_{i+1}$ by the range code, $C_2$, the output of a mixer 17 given by the equation $X_b = C_{i+1} \oplus C_2$ which will be equal to a bit 1 and a bit 0 for equal periods of each cycle of the reference $C_{i+1}$. When samples of the signal $X_a$ are accumulated by counting up for each sample that is a bit O and down for each sample that is a bit 1, a correlation signal $S_a$ increases monotonically such that at the end of a total period of $4MT_{sc}$, a positive threshold level, +T, is exceeded. A threshold detector 18 detects that condition and emits a signal effectively indicating $S_A = +T$. Meantime samples of the signal $X_b$ are accumulated in a similar manner, but the correlation signal $S_b$ (sum of the accumulated samples) oscillates about zero. Consequently, a threshold detector 19 detects that the threshold level of ±T is not exceeded and emits a signal effectively indicating $S_B = 0$. This condition, $S_a = +T$ and $S_B = 0$, indicates that the cleanup loop is tracking the correct component, i.e., that $C_i$ from the function generator equals the input range code $C_2$.

When the input range code is stepped to $C_3$ the signal $X_a = C_2 \oplus C_3$ will be equal to a bit 1 and a bit 0 for equal periods of each cycle of the received signal $C_3$. Consequently, the threshold detected correlation signal $S_A$ will go to zero. Meantime the signal $X_b = C_{2+1} \oplus C_3$ will either be constantly a bit 0 or constantly a bit 1 according to whether $C_{2+1}$ is in phase with $C_3$ or a half code period out of phase with $C_3$. Assuming the in-phase condition, the correlation signal $S_b$ will exceed $+T$. This condition, $S_A = 0$, $S_B = +T$, indicates that the cleanup loop should be stepped from $C_i = C_2$ to $C_i = C_3$ with a positive phase, i.e., with the same phase for $C_3$ as before, and $C_{i+1} = C_4$. If the out-of-phase condition had existed, the correlation signal $S_b$ would have exceeded $-T$. This condition, $S_A = 0$, $S_B = -T$, indicates that the cleanup loop should be stepped to $C_i = -C_3$ and $C_{i+1} = C_4$, with a phase reversal of $C_3$. Should the input range code be stopped, or otherwise lost, both correlation signals $S_a$ and $S_b$ will go to zero, indicating that there is no input signal and that the function generator should restart the acquisition sequence with $C_i = C_1$ and $C_{i+1} = C_2$. In that manner the range cleanup loop will be prepared for the next time a range code sequence is transmitted by the ground station.

The foregoing summarizes the operation of the lock correlators 14, 15 and detectors 18, 19 in a simple cleanup loop similar to the one disclosed in the aforesaid U.S. Pat. No. 3,729,736. A logic network 20 responds to the threshold detected correlation signals $S_A$ and $S_B$ to control (select) the components $C_i$ and $C_{i+1}$ out of the function generator. The received signal is phase detected using a transition sample selector 21 by sampling the value of the received signal at transition instances of the $C_i$ reference signal. The resulting samples are accumulated for $MT_{sc}$ in an accumulator 22. The sign (most significant bit) of the value for each accumulation period is filtered by a loop filter 23 to provide a phase error signal which will phase shift the function generator by inhibiting clock pulses to be counted from a source 24 (negative phase shift for a negative error) or by effectively weighting clock pulses to be counted by a factor of 2 (positive phase shift for a positive error). The phase shifter is implemented to provide a phase shift correction for every M subcarrier cycles (i.e., once for every M cycles of the subcarrier $f_{sc}$).

Figure 2:
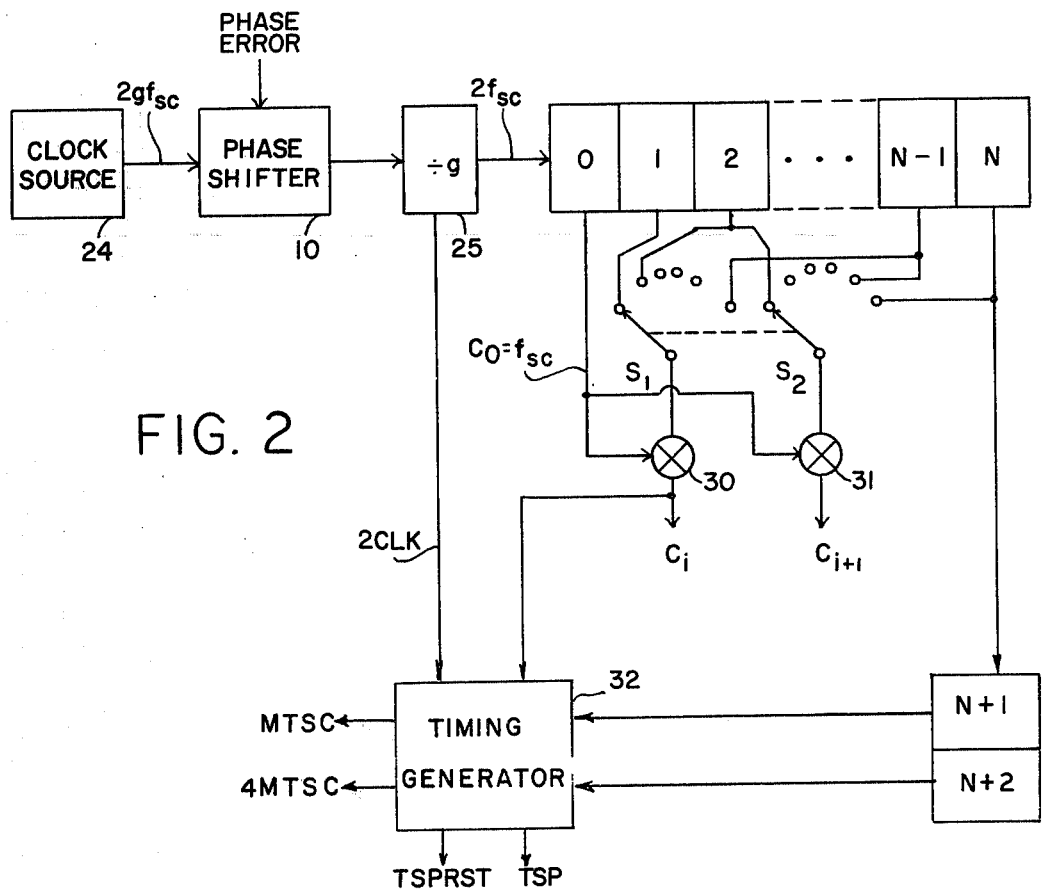
FIG. 2 illustrates schematically the implementation of a function generator for the system of FIG. 1.

FIG. 2 illustrates schematically the organization of the function generator 11. A binary counter having stages O through N driven by clock pulses from the source 24 generated at a frequency $2gf_{sc}$, phase shifted (bumped) and then frequency divided by $g$ in a frequency divider 25. The output of the first stage is therefore a squarewave signal $C_o$ at a frequency $f_{sc}$. Mixers (exclusive-OR circuits) 30 and 31 combine the outputs of successive pairs of stages according to the following equations $$C_i = C_o \oplus C_o/2^i \qquad (3)$$

$$C_{i+1} = C_o \oplus C_o/(2^{i+1}) \qquad (4)$$

Figure 3:
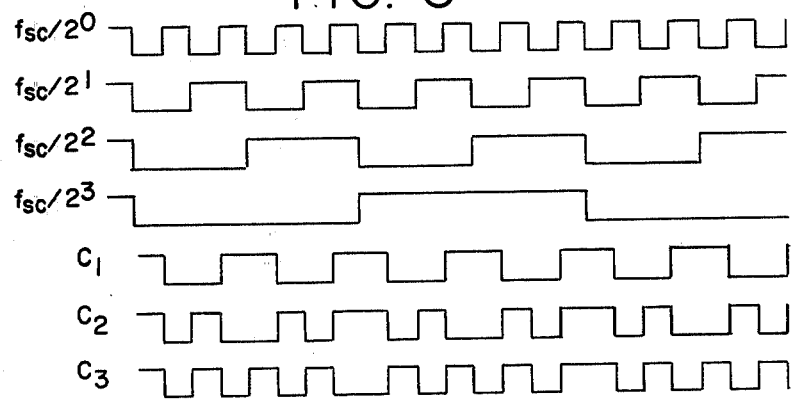
FIG. 3 is a waveform timing diagram useful in explaining the operation of the function generator of FIG. 2.

These equations conform to the general equation (1) and to the more specific equation (2) set forth hereinbefore. The waveforms for the first two sets ($C_1$, $C_2$) and ($C_2$, $C_3$) of components $C_i$, $C_{i+1}$ are shown in FIG. 3. The "restart" position for ganged switches $S_1$ and $S_2$ is shown. As the switch $S_1$ is stepped from stage to stage of the counter, the switch $S_2$ is stepped ahead of it one stage.

As noted hereinbefore, the concept of the present invention is to transmit a range code sequence from a ground station to a spacecraft over a single ranging channel, to track each range code $C_i$ by the cleanup loop, to transmit each range code $C_i$ back to the station, and to interrupt the range code sequence at any desired step for transmission of command codes over the ranging channel. That is done by transmitting the complement of a selected component $C_i$, namely $\overline{C_i}$, detecting that complement in the cleanup loop and switching the cleanup loop from a ranging code acquisition mode to a data demodulation mode. The data modulated on the subcarrier (at the symbol rate equal to the period of the ranging code component $C_i$) is then demodulated by the cleanup loop, i.e., by the first part of the correlator 14 since the sign of an in-phase bit integrator 37 at the end symbol bit time $T_s$ represents the data (bit 1 when negative and bit 0 when positive).

In that manner, the functions of ranging and command of a spacecraft are combined in the ranging channel without any need to provide a symbol tracking loop.

The complement $\overline{C_i}$ is not transmitted by the ground station until after the range code $C_i$ has been transmitted for sufficient time to assure that the cleanup loop is properly tracking. The threshold detected correlation signals $S_A$ and $S_B$ are at that time at $+T$ and 0, respectively. Upon transmitting the complement $\overline{C_i}$, the signals $S_A$ and $S_B$ will go to $-T$ and 0. Only the signals $S_A$ will change since the lower frequency $C_{i+1}$ from the function generator is still producing an output from the mixer 17 that alternates with the same period. It is only the output from the mixer 16 that will change in sign from a bit 0 to a bit 1, i.e., from positive to negative. Consequently, the accumulator 37 and its following accumulators 38 and 39 will increase monotonically in the negative direction, while an accumulator 40 at the output of the mixer 17 oscillates about zero. Consequently after an accumulating period of $4MT_{sc}$, the correlation signal $S_a$ will exceed $-T$, and the correlation signal $S_b$ will still be at substantially 0. This condition ($S_A = -T$, $S_B = 0$) is detected by the logic network 20 to activate a mode control unit 41 which changes switches $S_3$, $S_4$ and $S_5$ from the acquisition (ACQ) mode position shown to the demodulation (DEMOD) mode for demodulation of data phase-shift modulated on the subcarrier at a symbol rate equal to the symbol rate of the range code $C_i$, i.e., modulated with a symbol period $T_s$ equal to the period of the ranging code $C_i$. The sign (SGN) of the accumulator 37 is the demodulated data and is transmitted through the switch $S_3$. That sign is indicated in FIG. 1 by a separate block 42, but in practice it is actually the most significant bit of the accumulator 37.

Since the look detection section 12 must continue with the selection of the range code component $C_i$, and the phase error detection section 13 must continue to track the component $C_i$, even though the complement $\overline{C_i}$ is being received to switch to the acquisition mode, the correlation sign of the accumulator 22 is multiplied in a mixer (exclusive-OR circuit) 43 by the sign of the accumulator 38. These signs denoted by blocks 44 and 45 are in actuality the most significant bits of respective accumulators 38 and 46.

It should be noted that the total accumulation provided by the accumulators 37 and 38 is equal to the total accumulation provided by the acumulator 22, which is an accumulation over a total period $MT_{sc}$, where M is the number of subcarrier cycles per phase correction and $T_{sc} = 1/f_{sc}$, as noted hereinbefore. In practice, the total period $MT_{sc}$ is selected to be equal to the greatest range resolution desired, which is typically 1 second for a range resolution of 1/8000 parts to 1, i.e., where $T_s$, the range code symbol time, may vary from 1/8000 sec to 1 sec.

The accumulators 37 and 38 are implemented such that the accumulator 37 will accumulate for the symbol period $T_s$, and the accumulator 38 will accumulate for the period $MT_{sc}$. The accumulator 22 is implemented in exactly the same manner using an accumulator 47 to accumulate for symbol period $T_s$, and the accumulator 46 to accumulate for the period $MT_{sc}$. Thus, while the total period $MT_{sc}$ is predetermined and constant, the period $T_s$ will vary as $C_i$ varies. Consequently, the component $C_i$ controls the accumulators 37 and 47. At the end of each $C_i$ period, the contents of the accumulators 37 and 47 are summed with the contents of the respective accumulators 38 and 46 which are reset after each $MT_{sc}$ period.

While in the acquisition mode, and clearly tracking range code $\underline{C_i}$, the reception and correlation of the input signal $\overline{C_i}$ with the component $C_i$ from the function generator will produce negative signs 44, 45 at the accumulators 38 and 46 which, upon being multiplied in the mixer 43, produces a positive error signal to maintain phase lock during the initial $MT_{sc}$ periods of the range code $\overline{C_i}$. After a minimum of four times that period, the accumulator 39 completes correlation in the lock detection section 12 to produce a signal $S_a$ that exceeds the negative threshold, $-T$. The logic network 20 then actuates the control unit 41 to switch the system to the demodulation mode by moving up switches $S_3$, $S_4$ and $S_5$.

Immediately upon switching to the demodulation mode, the sign 42 will be initially negative, and will become positive from time to time according to the data modulated on the subcarrier component $C_i$. It is desirable to present the accumulator 38 with only positive sums from the accumulator 37 in order that the logic network determine that it is tracking the correct component. To accomplish that, the switch $S_4$ connects the input of the accumulator 38 to a mixer 48 which effectively multiplies the output of the accumulator 37 by $-1$ when its sign 42 is negative. The result is that during the demodulation mode, the output of the accumulator 38 is always positive once the switch $S_4$ is in the DEMOD position. The mixer 43 then receives only a positive sign to effectively multiply the output of the accumulator 22 by a $+1$ after the initial $4MT_{sc}$ period of the received signal $\overline{C_i}$. In that manner the compensation introduced by multiplying the output of the accumulator 2 by $-1$ in the mixer 43 is only during the time it takes to recognize the signal $\overline{C_i}$ and activate the control unit 41 to the DEMOD mode. Thereafter, it is as if the mixer 43 were not present because the sign 44 of the accumulator 38 is always positive during the demodulation mode even though the sign 42 of the accumulator 37 is sometimes positive and sometimes negative as the data is demodulated.

It should be noted that the sign of the accumulator 47 in the phase error detection section 13 is also sometimes positive and sometimes negative due to the data modulated on the subcarrier signal received. To nullify the effect of the sign alternating in the phase error detection section, the sign 42 of the accumulator 37 is applied to a mixer 49. The output of the mixer 49 is connected to the input of the accumulator 46 during the DEMOD mode by the switch $S_5$. The result is that when the sign 42 of the accumulator 37 is negative, the negative output of the accumulator 47 is multiplied by $-1$, and when the output of the accumulator 37 is positive, the output of the accumulator 47 is multiplied by $+1$. The input to the accumulator 46 is thus always of the appropriate sign to compensate for the phase tracking error.

Before describing a preferred implementation of an exemplary system, a few constraints will be discussed within which the system must operate. First, the command bit rate is coherently related to the subcarrier rate. The reason for this is ease of generation of command signals of the ground, as well as the reference components, $C_i$, in the spacecraft. Actually, only systems wherein the subcarrier and bit rates are related by a power of 2 will be contemplated, although this constraint is not absolutely necessary, as noted hereinbefore. Second, systems having multiple command rate capabilities will be contemplated with the proviso that the lowest symbol rate is one symbol per second and that a particular symbol rate will only be used if the symbol energy-to-noise density ratio at that symbol rate exceeds 10 dB ($P_e < 10^{-5}$). Finally, the received signal at the spacecraft will be allowed to undergo a doppler frequency shift. For a more complete description of parameters for the system, reference is made to a report by James R. Lesh titled "A Multiple-Rate Digital Command Detection System with Range Cleanup Capability" in the Deep Space Network Program Report 42-26, pp. 91-101, Apr. 15, 1975.

The lock and code selection logic network 20 will now be described with reference to FIG. 4, but first the five possible states of the threshold detected correlation signals $S_A$ and $S_B$ that are of interest will be reviewed with reference to the followng table.

TABLE I

| \multicolumn{3}{c}{LOCK & CODE SELECT LOGIC} |
| $S_A$ | $S_B$ | INITIATE FUNCTION |
| --- | --- | --- |
| 0 | 0 | No Signal: Restart |
| 0 | +T | Step to $C_{i+1}$ (Pos. Phase) |
| 0 | −T | Step to $C_{i+1}$ (Neg. Phase) |
| +T | 0 | Tracking Correct Comp. $C_i$ |
| −T | 0 | End ACQ - Start DEMOD |

There are other possible states, such as $S_A = \pm T$ and $S_B = \pm T$, but only those states in which either $S_A$ or $S_B$ is zero are of interest, the rest of the possible states are "don't care" states.

To implement the functions, the threshold detectors 18 and 19 are implemented to provide respective pairs of in-phase (I) and quadrature (Q) signals, as shown in the following tables

TABLE II

| \multicolumn{2}{c}{$S_a$ Threshold Detector} | |
| --- | --- |
| $S_a$ +T | LEPTI = 1 |
| $S_a$ −T | GENTI = 1 |
| $S_a > +T$ | LEPTI = 0 |
| $S_a < -T$ | GENTI = 0 |

TABLE III

| \multicolumn{2}{c}{$S_b$ Threshold Detector} | |
| --- | --- |
| $S_b$ +T | LEPTQ = 1 |
| $S_b$ −T | GENTQ = 1 |
| $S_b > +T$ | LEPTQ = 0 |
| $S_b < -T$ | GENTQ = 0 |

Each comparator may thus be effectively implemented by two threshold detectors. One detects when its correlation input signal is less (L) than or equal (E) to a positive (P) threshold (T), and the other detects when the input signal is greater (G) than or equal (E) to a negative (N) threshold (T). It should be noted that in this context a negative value of a given absolute value is greater than a negative value of greater absolute value, i.e., greater than a more negative value. The action states of Table I thus translates into the code words of the following table

TABLE IV

| STATES | | CODE WORD | | | |
|---|---|---|---|---|---|
| $S_a$ | $S_b$ | LEPTI | GENTI | LEPTQ | GENTQ |
| 0 | 0 | 1 | 1 | 1 | 1 |
| 0 | +T | 1 | 1 | 0 | 1 |
| 0 | −T | 1 | 1 | 1 | 0 |
| +T | 0 | 0 | 1 | 1 | 1 |
| −T | 0 | 1 | 0 | 1 | 1 |

Figure 4:
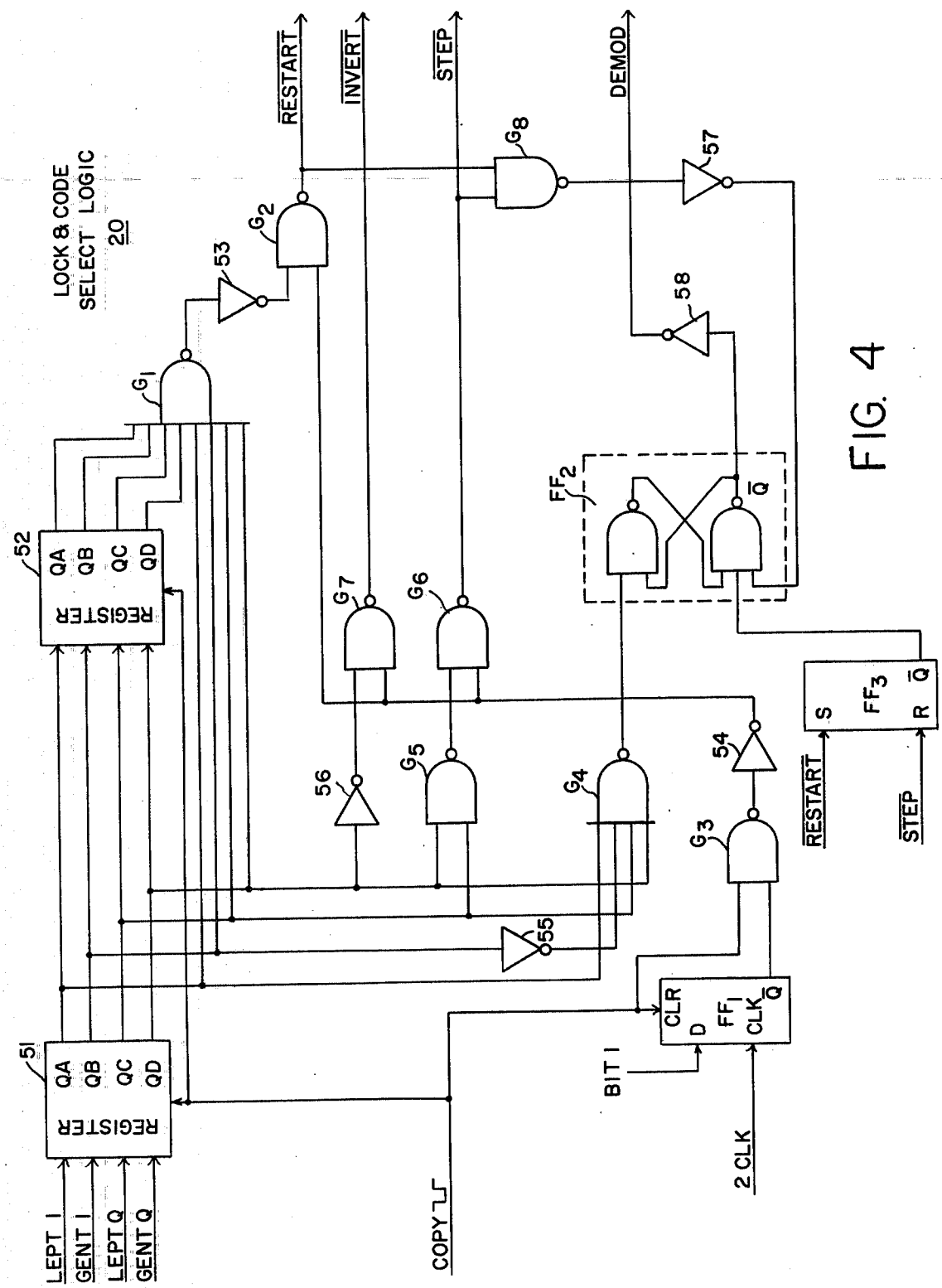
FIG. 4 is a logic diagram of control means (lock and code select logic) for the system of FIG. 1.

When there is no signal, the input code work (1111) to the logic network of FIG. 4 is stored in a first buffer register 51 at the end of a $4MT_{sc}$ period by a short negative going COPY pulse synchronized with a 2CLK pulse generated by the clock source at a high frequency ($32f_{sc}$) which is twice the system clock ($CLK = 16f_{sc}$). If there is still no signal after the next $4MT_{sc}$ period, the code word in the register 51 is transferred to a register 52, and the code word (1111) is again entered into the register 51. This condition is detected by a NAND gate $G_1$. An inverter 53 couples the output of gate $G_1$ to a NAND gate $G_2$ which is then enabled to generate a $\overline{RESTART}$ signal by a flip-flop $FF_1$ via a NAND gate $G_3$ and inverter 54. The flip-flop $FF_1$ is cleared (reset) by the COPY pulse to enable the gate $G_3$ at the end of the COPY pulse. When a high frequency ($32f_{sc}$) clock pulse, 2CLK, from the source 24 occurs, the flip-flop is set to disable the gate $G_3$, thus producing a single negative going pulse at the output of the gate $G_3$ that is inverted by the inverter 54. The inverted pulse is then transmitted by the gate $G_2$ as a $\overline{RESTART}$ signal to reset the function generator $C_1$ and $C_2$ at the beginning of a new $4MMT_{sc}$ period. At the same time the output of a NAND gate $G_4$ will be 1 due to an inverter 55 coupling the QB output of the register 51 to an input of that gate. Consequently, the output of the gate $G_4$ will not affect a 0-setting flip-flop $FF_2$. That flip-flop will normally be in the reset state and will be set only when all input terminals of the gate $G_4$ are equal to 1.

Assuming a normal sequence of events following a "restart", the ranging code $C_1$ is received first and correlated with the local references $C_1$ and $C_2$. After a sufficient time to acquire and lock on the component $C_1$, the correlation signal $S_a$ will exceed the threshold +T, while the correlation signal $S_b$ will continue to be less than "T but greater than −T, i.e., between +T and −T. Consequently, the action state indicated produces the code word 0111 which signifies to the lock and code select logic of FIG. 4 that the current code $C_i$ is being tracked, and that is all. No action is initiated. Later when the code $C_2$ is received, the correlation signal $S_a$ will go to zero and the correlation signal $S_b$ will exceed ±T. Assuming it exceeds +T, the action state indicated by the signals $S_a$ and $S_b$ produces the code word 1101 at the end of a period $4MT_{sc}$, which is entered into the register 51. At the same time the flip-flop $FF_1$ is cleared to permit another single pulse to be generated out of the gate $G_3$. At that time the bit 0 just entered into the register 51 appears at output QC to raise the output of a gate $G_5$ to a bit 1. The single pulse out of the inverter 54 is thus reinverted by a NAND gate $G_6$ to produce a control signal $\overline{STEP}$ which steps the function generator to the next set of components $C_2$ and $C_3$.

If the correlation signal $S_b$ had exceeded −T, i.e., had been negative and exceeded the absolute threshold value T, while the correlation signal $S_a$ remained at zero, the code word produced and entered into the register 51 would have been 1110. The output QD of that register would have then raised the output of the gate $G_5$ to a bit 1 so that again a signal $\overline{STEP}$ would have been transmitted to the function generator. The gate $G_5$ thus provides an OR function to step the function generator if the correlation signal $S_b$ exceeds +T or −T. However, if it exceeds −T, it is known that the received code is out of phase with the reference $C_{i+1}=C_2$. Consequently, in stepping the local reference $C_i$ to $c_2$, it is necessary to invert the phase of the reference. The control signal for inverting the phase is produced by a NAND gate $G_7$ which is enabled by the output QD of the register 51 via an inverter 56 at the same time the NAND gate $G_6$ is enabled via the NAND gate $G_5$.

Each time a step control signal is generated, or whenever a restart signal is generated, the flip-flop $FF_2$ is reset via a NAND gate $G_8$ and an inverter 57 to assure that a DEMOD signal is not generated.

At any time that the complement of a current ranging code is transmitted by the ground station, to signal that data follows, the correlation signal $S_a$ (which just prior to that time will have exceeded +T) will exceed the threshold level T in the negative direction after a full $4MT_{sc}$ period. Consequently, the code word entered into the register 51 at the end of that full $4MT_{sc}$ period will be 1011. The bit 0 at the QB output of the register 51 is inverted by the inverter 55 making all inputs to the gate $G_4$ equal to a bit 1. The output of the gate $G_4$ is thus driven to a bit 0 so that the flip-flop $FF_2$ is set to transmit a DEMOD signal to the control unit 41 (FIG. 1) via an inverter 58.

To avoid the possibility of setting the flip-flop $FF_2$ even before acquiring lock, and thus entering the DEMOD mode prematurely, a flip-flop $FF_3$ is reset by the negative going $\overline{RESET}$ pulse and then set by a $\overline{STEP}$ signal. The $\overline{Q}$ output of that flip-flop $FF_3$ is connected to an additional reset input of the flip-flop $FF_2$.

In summary, the threshold detected correlation signals $S_A$ and $S_B$ are produced as paired in-phase and quadrature signals LEPTI, GENTI and LEPTQ, GENTQ to signify: (1) when no signal is present, at which time the lock and code select logic of FIG. 4 emits a signal $\overline{RESTART}$; (2) when a new ranging code $C_{i+1}$ is received, at which time the logic emits a signal $\overline{STEP}$; (3) when the new ranging code $C_{i+1}$ received is 180° out of phase with the reference component $C_{i+1}$ being generated, at which time a signal $\overline{INVERT}$ is also emitted along with the signal $\overline{STEP}$; and (4) when the ranging code $C_i$ being received is inverted (180° out of phase with the reference component $C_i$ being generated), at which time a signal DEMOD is emitted by the logic. The DEMOD signal is stored in the flip-flop $FF_2$ until a $\overline{RESTART}$ or a $\overline{STEP}$ signal is emitted. At that time the flip-flop $FF_2$ is reset. In the meantime, the control unit 41 maintains the switches $S_3$, $S_4$ and $S_5$ in the DEMOD position.

The control unit 41 is shown schematically as an electromechanical unit, such as a relay with ganged contacts, but in practice the switches are implemented with solid-state switches to reduce size, weight and power. The stepping switches $S_1$ and $S_2$ of the function generator 11 shown schematically in FIG. 3 are also implemented with solid state switches using a ring counter, or the equivalent of a ring counter, to step through the reference components $\overline{C_1, C_2 \ldots C_n}$ in sequence until reset by the signal $\overline{\text{RESTART}}$. At each state of the ring counter a pair of adjacent components is selected to produce the reference components $C_i$ and $C_{i+1}$. The signal $\overline{\text{INVERT}}$ is a short pulse which is used in the function generator to effectively reset every state to its opposite state, thus inverting the phase of the pair of components $C_i$ and $C_{i+1}$ being generated.

The arrangement for an exemplary embodiment of the correlator 14 will now be described with reference to FIG. 5. An up-down counter 60 receives at its input the output of the mixer (exclusive-OR circuit) 16, and effectively counts up each clock pulse, CLK, applied when its input is a logical 0 and down when it is not. As noted hereinbefore the rate of these clock pulses is selected to be 16 times $f_{sc}$. For example, if $f_{sc}$ is selected to be 16KHz, the frequency of the clock pulses, CLK, generated by the source 24 (FIG. 1) is 256 KHz. The input is thus sampled at the fixed rate of 256KHz. A reset TSPRST generated by a timing pulse generator 32 (FIG. 2) resets the counter 60 at the end of each reference $C_i$ period, thus providing accumulation in the counter 60 for a symbol period $T_s$ of $C_i$. At the same time, the content of the counter is added through an adder 61 to the content of a storage register 62 to continue accumulating samples in response to a TSP pulse.

The counter 60 is connected to the adder 61 via a bank 63 of exclusive-OR gates such that, under normal operation in the acquisition mode, the content of the counter 60 is transmitted unaltered. When in the DEMOD mode, and AND circuit (NAND gate and inverter) 64 transmits a bit 1 to the second input terminal of every exclusive-OR gate in the bank 63, thereby causing, the bank 63 to transmit to the adder 61 the ONES complement of counter 60 when the sign, SGN, of the counter is negative (bit 1). The sign is the most significant bit of the counter which becomes a bit 1 only when the counter counts down through zero. The counter 60 is made sufficiently large not to overflow while counting up-down, The signal SGN thus gated by the AND circuit 64 to control the bank of exclusive-OR gates is also applied to the carry input terminal at the least significant bit position of the adder 61 to form the two's complement of the content of the counter 60 as it is added to the content of the storage register 62. In that manner, the absolute correlation value of each symbol correlated during the DEMOD mode is added. Since the output of the AND circuit 64 is the sign of each symbol correlation value, that output is also the demodulated command symbol received during the DEMOD mode of operation.

At the end of each $MT_{sc}$ period, where M is the number of subcarrier cycles per phase correction in the phase shifter 10 (FIG. 1) and $T_{sc}$ is the period of the basic subcarrier frequency $f_{sc}$, as noted hereinbefore, a signal MTSC is generated by the timing generator 32 (FIG. 2) to reset the storage register 62 and at the same time add its content to the content of a storage register 65 through an adder 66. In practice, the period $MT_{sc}$ is selected to be a fixed whole number of symbols periods, $T_s$, for any reference component $C_i$ from $C_1$ through $C_n$, such that a signal TSPRST also occurs when a signal MTSC occurs. The result is that while the counter 60 accumulates correlation samples for a variable period $T_s$, the storage register 62 accumulates for a period $MT_{sc}$. The storage register 65 is reset by a signal 4MTSC, generated by the timing generator 32 every four $MT_{sc}$ periods to conclude a correlation period of $4MT_{sc}$. At that time, the output of the register (denoted $S_a$ in FIG. 1) is threshold detected in the detector 18 (FIG. 1) by comparing it to +T and −T as to both sign and magnitude.

In practice a single adder can be used to implement the adders 61 and 66 by using a multiplexer to at one time connect it between the counter 60 and the register 62, and at another time between the register 62 and the register 65. This can be done to conserve both weight and power.

Figure 5:
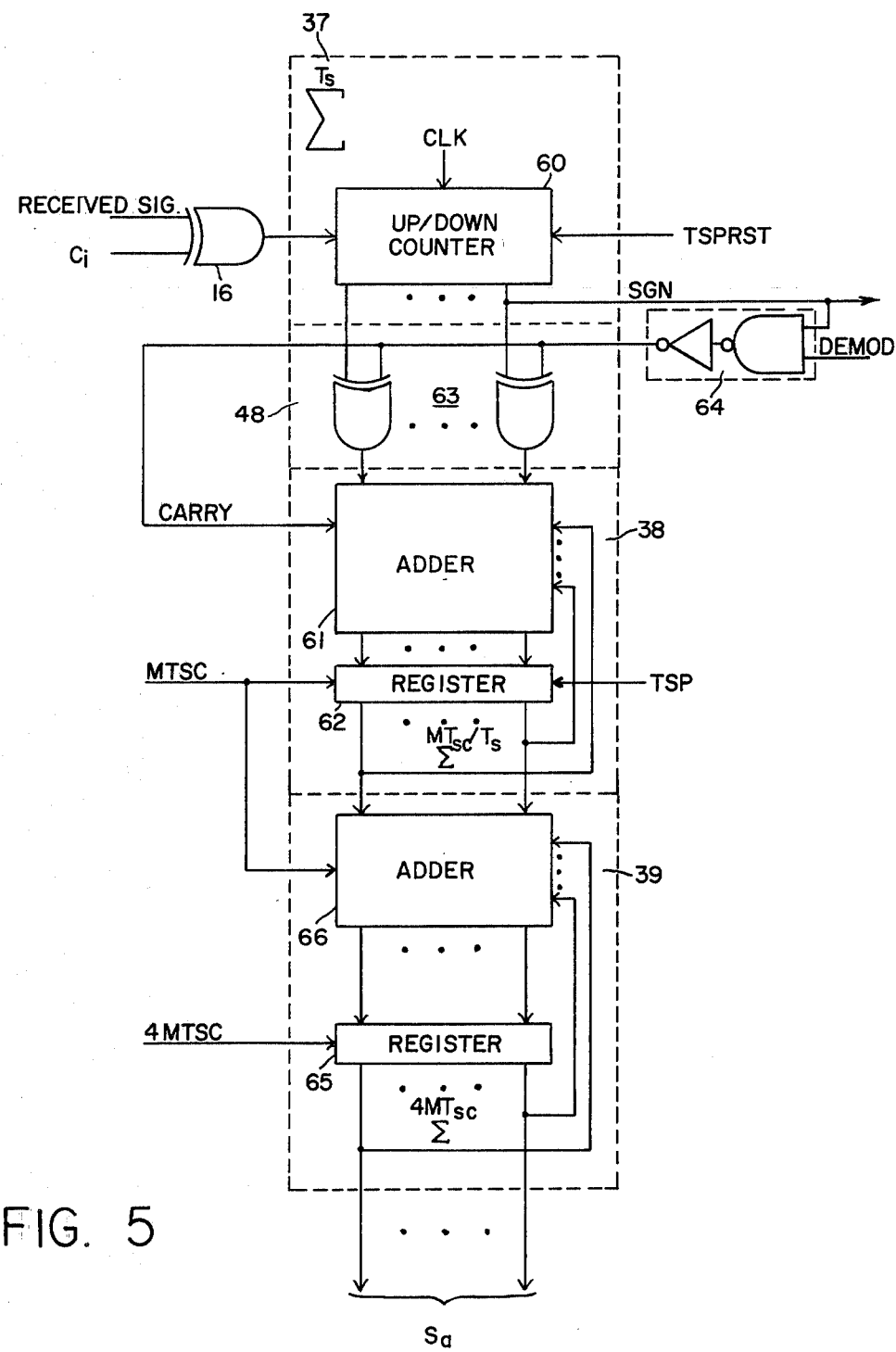
FIG. 5 illustrates a preferred arrangement for a first correlating and lock detecting means of a cleanup in the system of FIG. 1 with compensation for data demodulation during a demodulating mode of operation.

The correlator 15, which accumulates correlation samples over a period of $4MT_{sc}$ could be implemented in a manner similar to that shown for the correlator 14 in FIG. 5, but without the bank of exclusive-OR gates. However, it is preferably implemented as an up-down counter of sufficient length to accumulate for the period $4MT_{sc}$ without any overflow. At the end of each $4MT_{sc}$ period, the signal 4MTSC resets the accumulator 40 (FIG. 1) and at the same time compares its output, $S_b$, with ±T in the threshold detector 19.

The accumulator 22 is implemented in a manner strictly analogous to the accumulators for the correlator 14, as described with reference to FIG. 5, with the mixer 49 and mode control switch $S_5$ implemented by a bank of exclusive-OR gates, just as the mixer 48 and switch $S_4$ are implemented by the bank of exclusive-OR gates 63 shown in FIG. 5.

Although a particular embodiment of the invention has been described and illustrated herein, it is recognized that modifications and equivalents may readily occur to those skilled in the art. For example, the constant K in equation (1) has been selected to be the integer 2 for more convenient implementation, but it may be any whole integer greater than 1. Consequently, it is intended that the claims be interpreted to cover such modifications and equivalents.

What is claimed is:

1. In a $\mu$-type ranging system which uses a sequence of composite ranging code signals transmitted by a station to a receiver having a cleanup loop that generates a synchronous reference code signal for each ranging code signal received in sequence, each reference code signal being retransmitted as a replica of each sequential ranging code signal received, a system for detecting command symbols phase modulated onto a composite ranging code signal at a command symbol rate coherently related to the symbol rate of the ranging code signal being transmitted at the time by the station, thus using the ranging code signal as a data subcarrier, thereby providing multirate data communication without dedicating a separate uplink channel, comprising lock detection means for correlating said received code signal with said reference code signal, and in response to correlation values produced, detecting when the inverse phase of said ranging code signal is being received, a phase error detection means for producing an error signal proportional to the phase difference between a received ranging code and said reference code, correcting means responsive to said phase error signal for so correcting the phase of said reference code as to phase lock the reference code signal to the received code signal, switching means responsive to said correcting means for switching said lock detection means and said phase error detection means to a demodulating mode of operation upon detecting said inverse phase, said demodulating mode including in said lock detection means an arrangement of means for detecting command symbols at the symbol rate of said reference code by accumulating correlation values for each symbol rate period, $T_s$, and deriving the sign of each correlation sum as a detected command symbol, and means in said phase error detection means responsive to said detected command symbols for compensating detected phase error command symbol modulation on said received code signal period.

2. A system as defined in claim 1 wherein said lock detection means includes means for accumulating correlation values for a number of subcarrier cycles sufficiently large to include a whole number of the symbol rate periods of said reference code by accumulating correlation values in a first accumulating means for each symbol rate period as determined by said reference code signal, and accumulating said number of correlation sums from said first accumulating means in a second accumulating means, whereby command symbols are detected by said first correlation means without any need for a separate symbol synchronizing loop.

3. A system as defined in claim 2 wherein said phase error detection means includes means for accumulating correlation values for said number of subcarrier cycles, and wherein said phase correcting means includes means responsive to the sign of said second accumulating means for automatically compensating the sign of any phase error detected for the phase inversion of said signal component received while that phase reversal is being detected by said lock detection means before said mode switching means switches to said demodulating mode.

4. A system as defined in claim 3 including means responsive to said switching means in said demodulating mode for multiplying each correlation sum from said first accumulating means to be accumulated in said second accumulating means by the sign of each correlation sum, thereby compensating for command symbols phase modulated onto the ranging code signal being recieved and correlated with a reference code signal of the same period during said demodulating mode.

5. A system as defined in claim 4 wherein said accumulating means in said phase error detection means includes a first phase-error accumulating means for each symbol rate period as determined by said reference code signal and a second accumulating means for accumulating correlation sums from said first phase-error accumulating means, and means responsive to said switching means in said demodulating mode for multiplying each correlation sum from said first phase-error accumulating means to be accumulated in said second phase-error accumulating means by the sign of each correlation sum of said first lock-detection accumulating means, thereby compensating in the phase error detected for command symbols phase modulated onto the ranging code signal being received.

6. A system as defined in claim 5 including detecting means within said lock detection means for detecting when the ranging code signal received is of the next range code in sequence, and means responsive to said detecting means for resetting said switching means to restore said lock detection means and said phase error detection means to an acquisition mode for normal range code tracking and transmitting.

7. A system as defined in claim 6 wherein said cleanup loop also generates a second reference code signal that is a replica of the next ranging code signal to be received in sequence, and wherein said means for detecting when the ranging code signal received is of the next ranging code in sequence is comprised of means for correlating the ranging code signal received with said second reference code signal, means responsive to said correlating means for detecting when correlation of the received ranging signal with said second reference code signal exceeds a predetermined threshold, and wherein said means within said lock detection means includes means responsive to said threshold detection means for stepping the first and second reference code signal to be correlated with the received ranging code signal to the next set of codes in sequence and for resetting said switching means from the demodulation mode to a normal acquisition mode for the ranging code signal received.

8. A system as defined in claim 4 wherein said first means for accumulating correlation values for each symbol period is comprised of digital means for accumulating values in digital form each for a period of said reference code, and said second accumulating means is comprised of an acumulating register and an added for adding the content of the digital accumulating means to the content of said register at the end of each period of said reference code.

9. A system as defined in claim 8 wherein said means for multiplying each correlation sum from said first means for accumulating correlation values by the sign of each correlation sum is comprised of a bank of exclusive-OR gates coupling the output of said first accumulating means in digital form to said adder, each exclusive-OR gate having its second input terminal connected to the sign bit output of said first means through gating means, means for enabling said gating means in responsive to said switching means when said lock detection means is switched to said demodulating mode, and means for coupling said sign to said adder as a carry into the least significant bit position thereof.

10. A system as defined in claim 9 wherein said phase correcting means in said phase error detecting means is connected to the sign bit position of said accumulating register in said second accumulating means.

11. A method of transmitting command symbols from a station to a receiver modulated on a subcarrier signal which is a composite signal, $C_i$, consisting of a signal of a frequency $f_{sc}$ modulated according to the equation $$C_i = f_{sc} \oplus f_{sc}/k^i$$

where $\oplus$ indicates modulo 2 addition if the signal levels are 0 and 1, or multiplication if the signal levels are +1 and −1, $K$ is a constant, $i$ is an integer successively increased from one in units of one to produce successive ranging code components $C_1, C_2 \ldots$, said receiver having a cleanup loop which provides synchronous replicas of the sequential ranging code components, $C_i$, for retransmission to the station, said method comprising the transmitting the inverse phase of a ranging code, $\overline{C_i}$, just prior to the time command symbols are to be transmitted, and for a sufficient time for said cleanup loop to detect the phase inversion, then phase modulating the ranging composite signal at the symbol rate of the composite signal such that a command symbol period is the same as a ranging code component $C_i$, detecting said inverse phase in said cleanup loop and converting the mode of operation of the cleanup loop to a demodulation mode when the inverse phase is detected, and while in said demodulation mode, correlating the synchronous replica, $C_i$, generated by the loop with the signal received for successive symbol periods for detecting command symbols as the signs of the successive correlation periods, and meantime compensating the cleanup loop for the command symbol modulation by multiplying the correlation value of each symbol period by its sign, thereby effectively nullifying the command symbol modulation during the demodulation mode of operation of the loop, whereby the loop continues to generate the replica, $C_i$, with the same phase as before the demodulation mode was initiated, whereby a multiple rate command system is provided without the need for a separate subcarrier channel and without the need for a separate synchronizing loop in the command symbol detection process.

12. The method of claim 11 further including the step of compensating the cleanup loop for the phase inversion of the composite signal received while it is being correlated and detected by multiplying any phase error detected by the loop in tracking the phase of the ranging component by the sign of correlation values of the correlation of the replica with the received signal for correlation periods fixed to be some multiple of the longest period of the ranging components of the ranging system.

13. in a $\mu$-type ranging system which uses a sequence of composite ranging code signals transmitted by a station to a receiver having a cleanup loop that generates a synchronous reference code signal for each ranging code signal received in sequence, each reference code signal being retransmitted as a replica of each sequential ranging code signal received, a method for detecting command symbols phase modulated onto a composite ranging code signal at a command symbol rate coherently related to the symbol rate of the ranging code signal being transmitted at the time by the station, thus using the ranging code signal as a data subcarrier, thereby providing multirate data communication without dedicating a separate uplink channel, comprising the steps of correlating said received code signal with said reference code signal, and in response to correlation values produced, detecting when the inverse phase of said ranging code signal is being received, producing an error signal proportional to the phase difference between a received ranging code and said reference code, correcting the phase of said reference code in response to said phase error signal so as to phase lock the reference code signal to the received code signal, switching said cleanup loop to a demodulating mode of operation upon detecting said inverse phase, said demodulating mode including detecting command symbols at the symbol rate of said reference code by accumulating correlation values for each symbol rate period, $T_s$, and deriving the sign of each correlation sum as a detected command symbol, in response to said detected command symbols, compensating detected phase error command symbol modulation on said received code signal period.

14. A method as defined in claim 13 wherein the first step includes accumulating correlation values for a number of subcarrier cycles sufficiently large to include a whole number of the symbol rate periods of said reference code by accumulating correlation values in a first accumulating means for each symbol rate period as determined by said reference code signal, and accumulating said number of correlation sums from said first accumulating means in a second accumulating means, whereby command symbols are detected by said first correlation means without any need for a separate symbol synchronizing loop.

15. A method as defined in claim 14 wherein the second step includes means for accumulating correlation values for said number of subcarrier cycles, and whereby said third step includes automatically compensating the sign of any phase error detected for the phase inversion of said signal component received in response to the sign of said second accumulating means while that phase reversal is being detected before switching to said demodulating mode.

16. A method as defined in claim 15 including the step of multiplying each correlation sum from said first accumulating means to be accumulated in said second accumulating means by the sign of each correlation sum while in said demodulating mode, thereby compensating for command symbols phase modulated onto the ranging code signal being received and correlated with a reference code signal of the same period during said demodulating mode.

17. A method as defined in claim 16 wherein said phase error detection includes accumulation in a first phase-error accumulating means for each symbol rate period as determined by said reference code signal and accumlation in a second accumulating means for accumulating correlation sums from said first phase-error accumulating means, and in response to switching to said demodulating mode, multiplying each correlation sum from said first phase-error accumulating means to be accumulated in said second phase-error accumulating means by the sign of each correlation sum of said first lock-detection accumulating means, thereby compensating in the phase error detected for command symbols phase modulated onto the ranging code signal being received.

18. A method as defined in claim 17 including the step of detecting when the ranging code signal received is of the next range code is sequence, and in response to the detecting step, restoring said cleanup loop to its acquisition mode for normal range code tracking and transmitting.

19. A method as defined in claim 18 wherein said cleanup loop also generates a second reference code signal that is a replica of the next ranging code signal to be received in sequence, and wherein detecting when the ranging code signal received is of the next ranging code in sequence is comprised of the steps of correlating the ranging code signal received with said second reference code signal, detecting when correlation of the received ranging signal with said second reference code signal exceeds a predetermined threshold, and stepping the first and second reference code signal to be correlated with the received ranging code signal to the next set of codes in sequence when said second reference code exceeds said threshold and resetting said cleanup loop from the demodulation mode to its normal acquisition mode for the ranging code signal received.

\* \* \* \* \*